May 17, 1960  J. F. VAIS  2,936,918
SPARE TIRE RACK
Filed Jan. 29, 1958  2 Sheets-Sheet 1
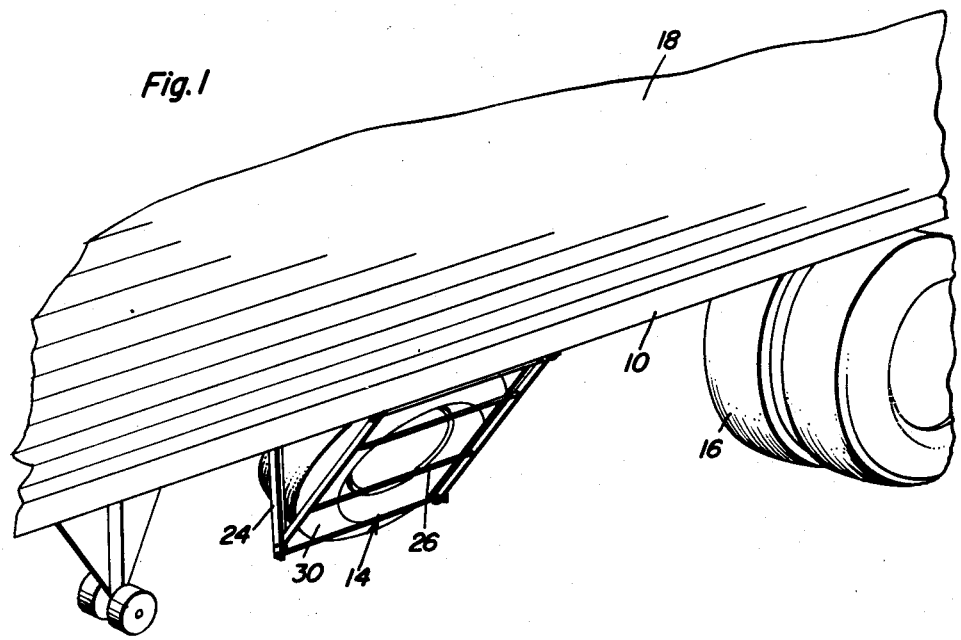
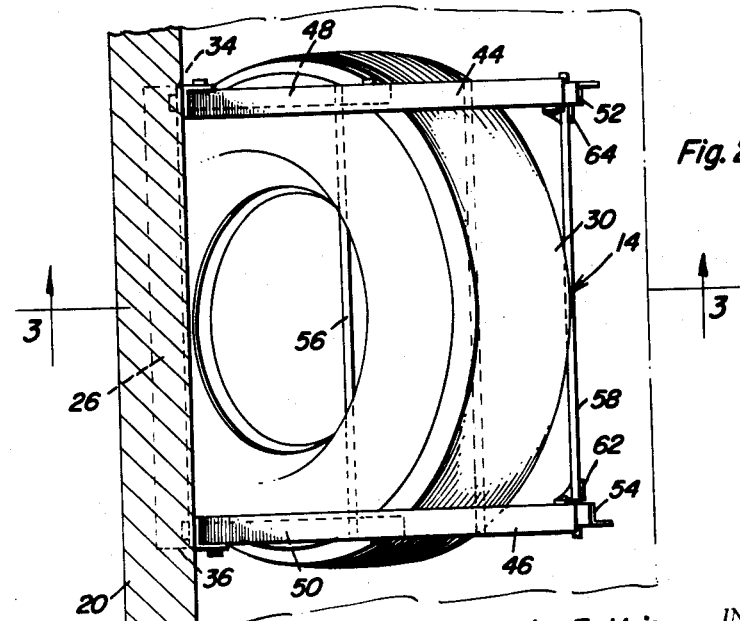
Joseph F. Vais  INVENTOR.

May 17, 1960 J. F. VAIS 2,936,918
SPARE TIRE RACK
Filed Jan. 29, 1958 2 Sheets-Sheet 2

Joseph F. Vais INVENTOR.

BY *(signatures)*
Attorneys

United States Patent Office 2,936,918
Patented May 17, 1960

2,936,918

SPARE TIRE RACK

Joseph F. Vais, Anita, Iowa

Application January 29, 1958, Serial No. 712,015

2 Claims. (Cl. 214—454)

This invention relates to carriers and more particularly to a spare tire carrier for trucks.

An object of the invention is to provide a mechanically simple and easily operable carrier for a truck. The carrier is supported at the center of the truck (approximately) and along one of its sides so that the tire is accessible for both storage and removal with a minimum of difficulty. The tire, stored in this location on the truck, is out of the way and is not easily damaged by road hazards, accidents. The truck's functions are not interfered with in any way.

The carrier has been mentioned as being mechanically simple. An object of this invention is to achieve the necessary support function for a spare tire of a truck with as little complication as possible. The spare tire carrier of this invention involves only a hinged frame that is suspended from a hanger beneath the truck and on which the spare tire is supported. When moved up, the frame automatically latches in the raised position. A very simple release permits the frame to be gravity lowered thereby presenting the tire to the trucker in such a way that it is capable of being slipped off the frame.

Although prior carriers for spare tires in trucks have been devised, each of them has had mechanical complexities involving wing nuts, screws, complicated latches and locks involving levers, etc. This invention very securely and safety holds the spare tire but yet does so by a structure which is not only easily used but which is inexpensive and practical.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a truck with a carrier in accordance with this invention applied in the preferred location thereon.

Figure 2 is a horizontal sectional view looking downward upon the top of the carrier.

Figure 3:
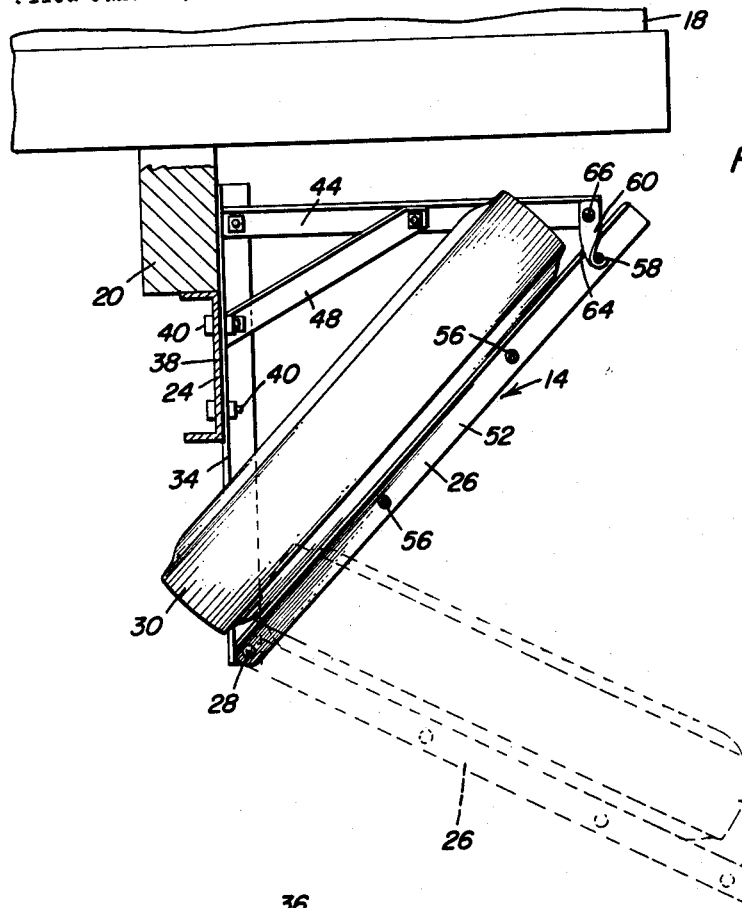
Figure 3 is a sectional view taken on the line 3—3 of Figure 2.
Figure 4:
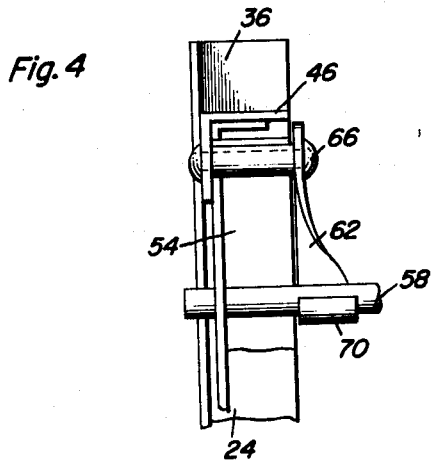
Figure 4 is a fragmentary elevational view showing one of the latches of the carrier.

In the accompanying drawings a truck 10 is illustrated to represent any manufacturer's make and type of truck with which carrier 14 would have practical use. The truck 10 has rear wheels 16, a body 18 and a longitudinal stringer 20 which is one of a pair in the chassis of the truck. Carrier 14 is bolted or otherwise attached to stringer 20 and is located at about the center of the truck measured from the front to the rear thereof and accessible from one side of the truck. Carrier 14 consists of a hanger 24 and a frame 26 that is secured to the lower end of hanger 24 by a pair of spaced trunnions 28, a hinge pin or the like. This pivotally or hingedly attaches frame 26 at its inner end to the lower extremity of hanger 24. The spare tire and/or wheel 30 is adapted to seat on the frame 26 and fit between the sides or hanger bars 34 and 36 of hanger 24. The distance between these sides is smaller than the diameter of the tire 30 so that the tire passes only a short distance through the space between the sides 34 and 36 and then lodges against the confronting surfaces of these sides.

Hanger 24 is made of sides 34 and 36 held spaced apart rigidly by a stout channel 38 that is bolted or otherwise fastened to each side. The channel is spaced from the upper ends of the sides 34 and 36 and spaced from their lower ends. It is adapted to fit under the lower surface of stringer 20 and to be secured thereto. The sides 34 and 36 are preferably made of channel construction with two flanges receiving bolts 40 or providing surfaces that are to be welded to the channel 38.

Hanger 24 has upper frame members or bars 44 and 46 which are bolted, welded or otherwise secured to the sides 34 and 36 near their upper extremities. Diagonal braces 48 and 50 are secured to the upper members 44 and 46 and to the sides 34 and 36 of the hanger 24.

Frame 26 is made of a pair of sides or side frame bars 52 and 54, each of which is of the same length and preferably made of angle iron. Transverse bars 56 are secured to sides 52 and 54 and are spaced from each other. The top cross connecting member 58 constitutes a part of latch 60 holding the frame 26 releasably attached to the top of hanger 24, (Figure 3) but releasing the hanger so that it can be lowered to a position where it functions as a slide for tire 30. The latched position of frame 26 has the tire 30 retained at an angle to the horizontal and vertical directions so that the tire slides toward the pivoted end of frame 26 and lodges between sides 34 and 36 as described previously.

Figure 5:
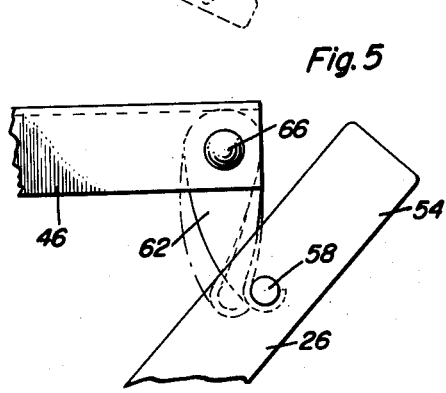
Figure 5 is a side elevational view showing the carrier latch in use.

Latch 60 is made of two latch keepers 62 and 64, each being identical. Latch keeper 62 is made of a flat metal strap having its upper end riveted as at 66 or otherwise attached to the outer end of hanger side 46. The strap is twisted between its upper and lower ends and has an upwardly opening hook portion forming a seat 70 in its lower end within which to accommodate the transverse bar 58. Each latch can be swung (see dotted line position of Figure 5) to engage and disengage the seat 70 with rod 58 of frame 26. The weight of the carrier frame 26 especially when loaded with a tire, keeps the latches in a closed position until a positive action is taken to swing the latches 62 and 64 and the frame upper rod 58 separated from the latches. When this happens frame 26 is gravity lowered and the tire slides off the frame since the pivoted end of frame 26 is above the ground level. This is essential not only for the correct operation of the carrier but also for road clearance.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A spare tire carrier for a truck having a longitudinal body stringer, said carrier comprising a self-contained unit adapted to be fastened to the stringer and including a pair of laterally spaced hanger bars attachable to said stringer in depending position, a pair of upper bars terminally fixed to and extending laterally outwardly from said hanger bars in parallel relation, a tire supporting frame including a pair of side frame bars terminally hinged to the lower ends of said hanger bars below said upper bars for swinging upwardly into inclined position to carry a tire in a position for sliding downwardly thereon towards said hanger bars, said hanger bars and side bars and frame forming an approximately triangular structure when said frame is in the upper position, a member cross connecting said side frame bars together for swinging in unison and located at the end of said frame remote from the hinged terminal of said frame, a pair of terminal latches pivoted on said upper bars for engaging the cross connecting member to releasably hold said frame in an upwardly swung position, and a structural member at the back of said hanger bars rigidly attaching said hanger bars together and spacing the same apart a distance less than the diameter of a tire so that a tire sliding downwardly on said side frame bars will wedge between said hanger bars.

2. The spare tire carrier according to claim 1 wherein said latch has an upwardly opening hook portion in which said cross-connecting member seats, and said latches being swingable inwardly towards said hanger bars to release said latches from said cross-connecting member to allow said frame to be hingedly lowered.

References Cited in the file of this patent

UNITED STATES PATENTS

| | | |
|---|---|---|
| 2,584,233 | Selzer | Feb. 5, 1952 |
| 2,743,831 | Fischer et al. | May 1, 1956 |

FOREIGN PATENTS

| | | |
|---|---|---|
| 753,962 | Great Britain | Aug. 1, 1956 |
| 824,144 | Germany | Dec. 10, 1951 |